US012756075B2

(12) United States Patent
Lim et al.

(10) Patent No.: US 12,756,075 B2
(45) Date of Patent: Oct. 6, 2026

(54) BATTERY CELL ASSEMBLY AND BATTERY PACKAGE COMPRISING SAID ASSEMBLY

(71) Applicant: KOREA ADVANCED INSTITUTE OF SCIENCE AND TECHNOLOGY, Daejeon (KR)

(72) Inventors: Cheolwoo Lim, Daejeon (KR); Gunsoo Shin, Daejeon (KR); Taeseong Jang, Daejeon (KR); Wonho Cha, Daejeon (KR); Jinkyu Kim, Daejeon (KR); Sangki Choi, Daejeon (KR); Joungki Seo, Gyeryong-si (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1058 days.

(21) Appl. No.: 17/780,817

(22) PCT Filed: Oct. 29, 2020

(86) PCT No.: PCT/KR2020/014861
§ 371 (c)(1),
(2) Date: May 27, 2022

(87) PCT Pub. No.: WO2021/107418
PCT Pub. Date: Jun. 3, 2021

(65) Prior Publication Data

US 2023/0020610 A1 Jan. 19, 2023

(30) Foreign Application Priority Data

Nov. 28, 2019 (KR) ........................ 10-2019-0156032

(51) Int. Cl.
*H01M 50/519* (2021.01)
*H01M 10/42* (2006.01)
*H01M 50/516* (2021.01)

(52) U.S. Cl.
CPC ....... *H01M 50/519* (2021.01); *H01M 10/425* (2013.01); *H01M 50/516* (2021.01)

(58) Field of Classification Search
CPC ....... H01M 50/50–503; H01M 50/507; H01M 50/514–519; H01M 10/42–4207; H01M 10/425; H01M 10/4271
See application file for complete search history.

(56) References Cited

U.S. PATENT DOCUMENTS 4,581,306 A * 4/1986 Hasenauer .......... H01M 50/526 429/211
2002/0022178 A1* 2/2002 Asaka .............. H01M 10/4257 903/903
(Continued)

FOREIGN PATENT DOCUMENTS

JP 2011-204584 A 10/2011
JP 5934754 B2 6/2016
(Continued)

OTHER PUBLICATIONS

International Search Report for PCT/KR2020/014861 mailed Feb. 10, 2021 from Korean Intellectual Property Office.

*Primary Examiner* — Nicole M. Buie-Hatcher
*Assistant Examiner* — Jacob Buchanan
(74) *Attorney, Agent, or Firm* — Paratus Law Group, PLLC

(57) ABSTRACT

A battery cell assembly electrically connected to a circuit board and a battery package including multiple battery cell assemblies are disclosed. The battery cell assembly includes a battery cell forming electrodes with opposite polarities on the upper and the lower ends, one end fixed to the upper end electrode so that an electric current can flow, the first connector including the other end extended in a direction away from the center of the battery cell, is made of metal plate, and includes the second connector including the other
(Continued)

end extended in a direction away from the center of the battery cell. The other end of the first connector and the other end of the second connector are extended in directions, so that the space between the two ends gets wider as they approach the bottom end, and directions that the two ends are not parallel with each other.

10 Claims, 7 Drawing Sheets

(56) References Cited

U.S. PATENT DOCUMENTS

| | | | | |
|---|---|---|---|---|
| 2009/0068555 A1* | 3/2009 | Fukuoka | H01M 50/516 | 429/160 |
| 2009/0297892 A1* | 12/2009 | Ijaz | H01M 10/643 | 219/121.64 |
| 2012/0135296 A1* | 5/2012 | Itoi | H01M 50/583 | 429/159 |

FOREIGN PATENT DOCUMENTS

| | | |
|---|---|---|
| JP | 6079787 B2 | 2/2017 |
| KR | 10-1761250 B1 | 7/2017 |
| KR | 10-1911545 B1 | 10/2018 |
| KR | 10-1985387 B1 | 6/2019 |

* cited by examiner

BATTERY CELL ASSEMBLY AND BATTERY PACKAGE COMPRISING SAID ASSEMBLY

CROSS-REFERENCE TO PRIOR APPLICATIONS

This application is a National Stage Patent Application of PCT International Patent Application No. PCT/KR2020/014861 (filed on Oct. 29, 2020) under 35 U.S.C. § 371, which claims priority to Korean Patent Application No. 10-2019-0156032 (filed on Nov. 28, 2019), which are all hereby incorporated by reference in their entirety.

BACKGROUND

The present invention relates to a battery cell assembly which is electrically connected to a circuit board and a battery package which comprises multiple battery cell assemblies.

From small electronic devices such as mobile phones to automobiles, devices such as satellites, as well as Energy Storage Systems (ESS), batteries are used to supply electric power. More specifically, secondary batteries capable of charging and discharging are used. Excluding small electronic devices, in automobiles, devices such as satellites, as well as energy storage systems, high voltage, large electricity, and long usage time are tried to be fulfilled by comprising battery packages consist of multiple battery cells that are electrically interconnected.

In Korea Patent No. 10-1761250 and No. 10-1911545, a battery package in accordance with conventional examples are disclosed. The aforementioned battery package comprises multiple cylindrical battery cells connected in series by tabs. Meanwhile, a battery package shall include a circuit board formed with balancing circuits for stable voltage output and life extension of each battery cell. The aforementioned balancing circuit must be electrically connected to each of all the battery cells individually. However, in the aforementioned conventional battery package, there is a problem that not all battery cells can be electrically connected to the circuit board individually.

To solve this problem, each battery cell can be connected to the circuit board using a wiring harness comprising electric wires. Though, in this case, as the number of the battery cells increases, more wiring harnesses become entangled inside of the case of the battery package, thus the space inside of the case gets cramped and the weight increases. In other words, it is difficult to reduce the size or the weight of a battery package and it could be difficult to repair when disorders occur.

SUMMARY

The present invention provides a battery cell assembly in which each battery cell can be connected to the circuit board individually, not through a wiring harness, and be connected to adjacent battery cell assembly in series, as well as a battery package comprising multiple numbers of the aforementioned battery cell assemblies.

The present invention provides a battery cell assembly. The battery cell assembly of the present invention includes battery cells, the first connector, and the second connector. At the upper and lower ends of the battery cell, electrodes with opposite polarities are formed. The first connector is composed of a metal plate, and includes one end and the other end. The one end of the first connector is fixed to the aforementioned electrode of the upper end, so that an electric current can flow. The other end of the first connector is extended in a direction away from the center of the aforementioned battery cell. The second connector is composed of a metal plate, and includes one end and the other end. The one end of the second connector is fixed to the aforementioned electrode of the upper end, so that an electric current can flow. The other end of the second connector is extended in a direction away from the center of the aforementioned battery cell. In this case, the aforementioned other end of the first connector and the aforementioned other end of the second connector are extended in directions, so that the space between the two ends gets wider as they approach the bottom end, and directions that the two ends are not parallel with each other.

The difference between the height of the aforementioned other end of the first connector and the height of the aforementioned other end of the second connector can be as same as the thickness of the aforementioned other end of the second connector.

The one end of the aforementioned first connector can be fixed to the aforementioned electrode of the upper end through welding, and the one end of the aforementioned second connector can be fixed to the aforementioned electrode of the upper end through welding.

In the aforementioned other end of the first connector and the other end of the second connector, through holes can be formed, in each of which connector pins made of metal can be placed.

The height of the aforementioned other end of the first connector and the height of the aforementioned other end of the second connector can be higher than the height of the aforementioned electrode of the upper end.

In addition, the present invention provides a battery package. The aforementioned battery package comprises battery cell assemblies, upper end and lower end supporting structures, a circuit board, and multiple connector pins. Multiple battery cell assemblies are arranged in a matrix. The upper end supporting structure and the lower end supporting structure support the upper end and the lower end of the aforementioned multiple battery cells, so that the battery cells of the aforementioned multiple battery cell assemblies are placed apart from each other. The circuit board is placed on either side of the upper side of the aforementioned upper end supporting structure or the lower side of the aforementioned lower end supporting structure. The multiple connector pins are to electrically connect the aforementioned multiple battery cell assemblies to the aforementioned circuit board, and are composed of metal. The other end of the first connector of one battery cell assembly among the aforementioned multiple battery cell assemblies and the other end of the second connector of another battery cell assembly that is adjacent to the aforementioned one battery cell assembly are overlapped in contact with each other, so that an electric current can flow, and one of the aforementioned multiple connector pins connect the aforementioned other end of the first connector and the other end of the second connector, in which an electric current can flow, and the aforementioned circuit board, so that an electric current can flow through them.

Through holes are formed in each of the aforementioned other end of the first connector and the other end of the second connector of the battery cell assembly. In addition, among the aforementioned multiple battery cell assemblies, if the other end of the first connector of one battery cell assembly and the other end of the second connector of another battery cell assembly that is adjacent to the aforementioned one battery cell assembly are overlapped in contact with each other, the through holes of the aforementioned other end of the first connector and the through holes of the aforementioned other end of the second connector can be aligned. In this case, the aforementioned connector pins may include stick portions and head portions. The stick portions are placed penetrating the aforementioned aligned through holes of the other end of the first connector and the through holes of the other end of the second connector. The head portions are placed in contact with the aforementioned circuit board.

In this case, the aforementioned circuit board can be placed on the upper side of the aforementioned upper end supporting structure. The aforementioned stick portions of the connector pins penetrate the aligned through holes of the other end of the first connector and the through holes of the other end of the second connector, and can be fixed in between the aforementioned upper end supporting structure. The aforementioned head portions of the connector pins can apply pressure on the aforementioned other end of the first connector and the other end of the second connector that are overlapped in contact, so that the two ends adhere to each other.

The aforementioned head portions of the connector pins can be fixed to the aforementioned circuit board through fastening bolts.

According to the battery package of the present invention, multiple battery cells are connected in series and at the same time, each of them are connected to the circuit board without a wiring harness. In the aforementioned circuit board, circuits corresponding to the Battery Management System (BMS) are formed, and the aforementioned circuits of the battery management system may include balancing circuits for stable voltage output and life extension of each battery cell. Therefore, the reliability for the performance of the battery package is improved and its lifespan is extended.

In addition, even if multiple numbers of battery cells are included, since there is no need for wiring harnesses as many as the number of the battery cells, it is easy to reduce the size and the weight of the battery package, and it is easy to disassemble and repair, when disorders occur.

DETAILED DESCRIPTION

Hereafter, the battery cell assembly and a battery package comprising said assembly will be described in further detail according to embodiments of the present invention in reference to the attached drawings. The terms used in the present specification are terminologies that are used to suitably represent a preferred form of embodiment of the present invention, and these may vary regarding to the intention of the user or the operator, customs of the field to which the present invention pertains, etc. Therefore, these terms should be defined based on the content throughout the present specification.

Figure 1:
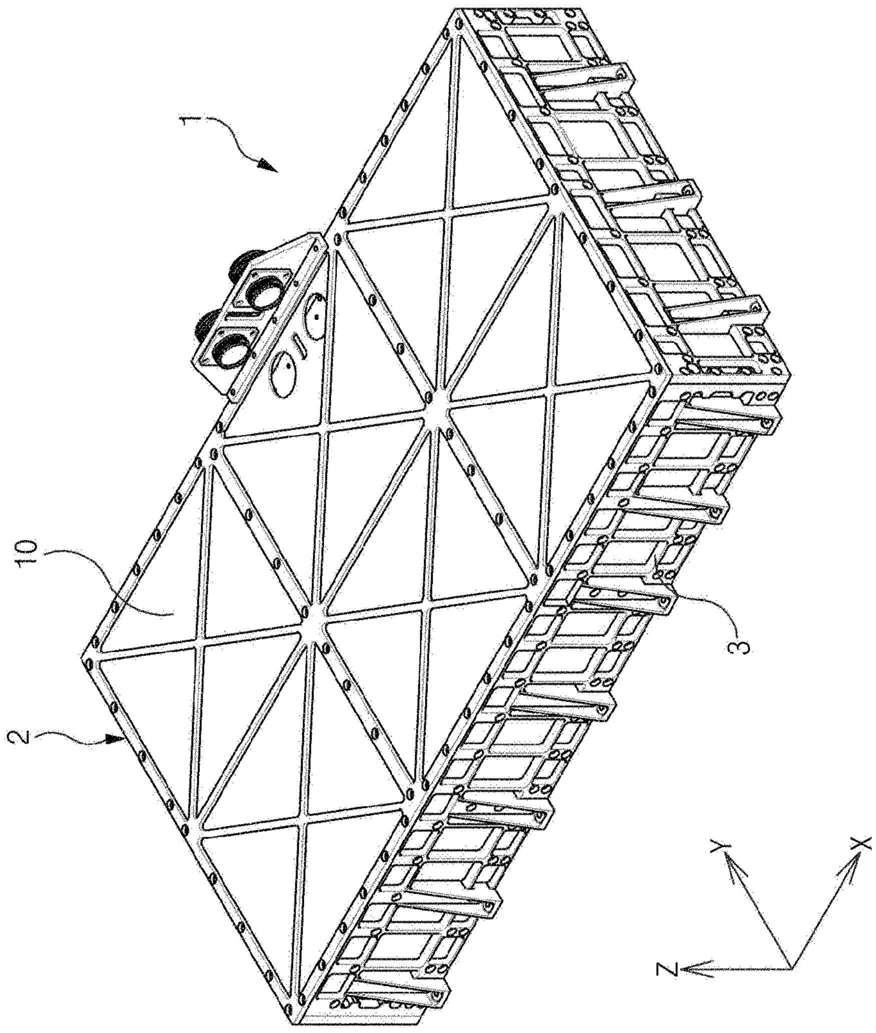
FIG. 1 is a perspective view of the battery package according to an embodiment of the present invention.
Figure 2:
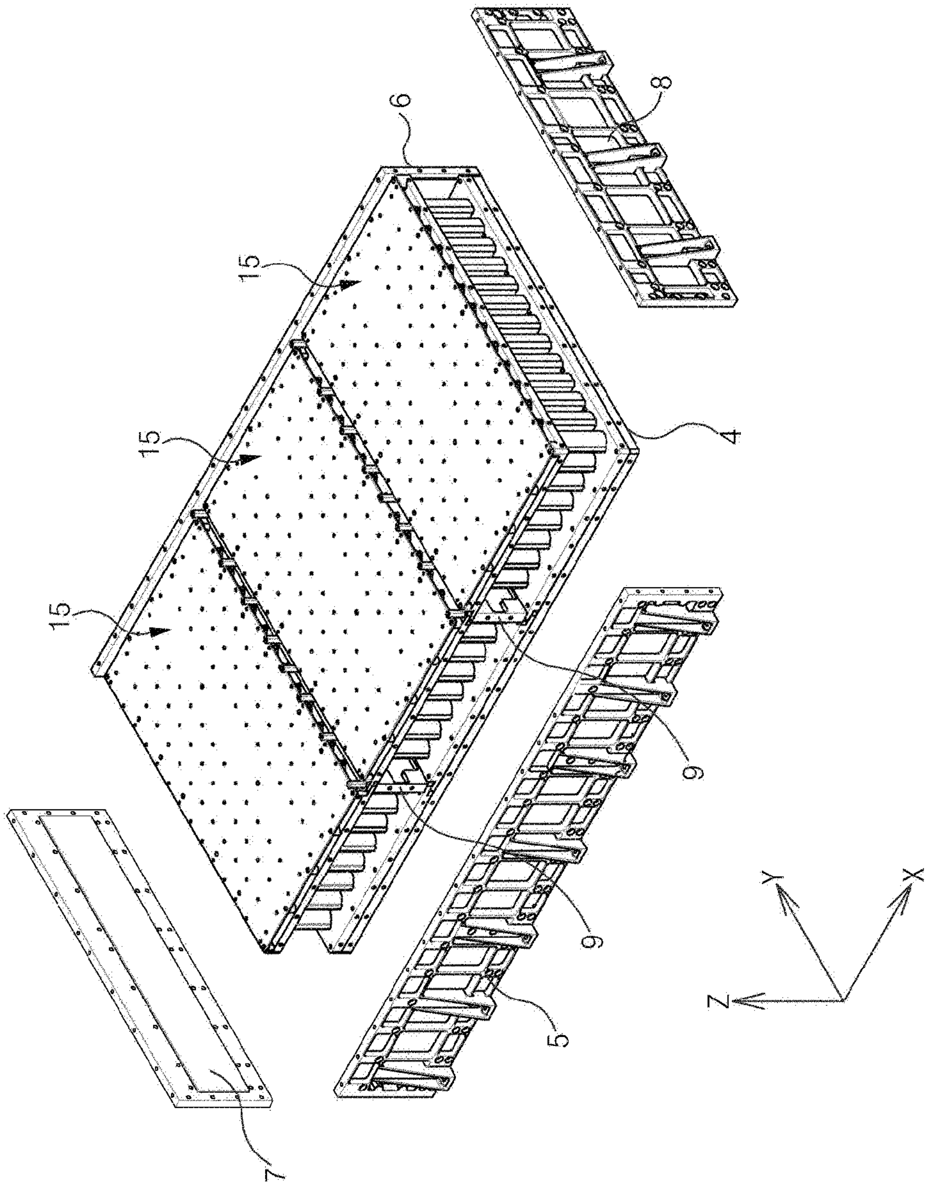
FIG. 2 is an exploded view drawing which illustrates a figure when the case cover from FIG. 1 is removed and the remaining parts of the case are disassembled.
Figure 3:
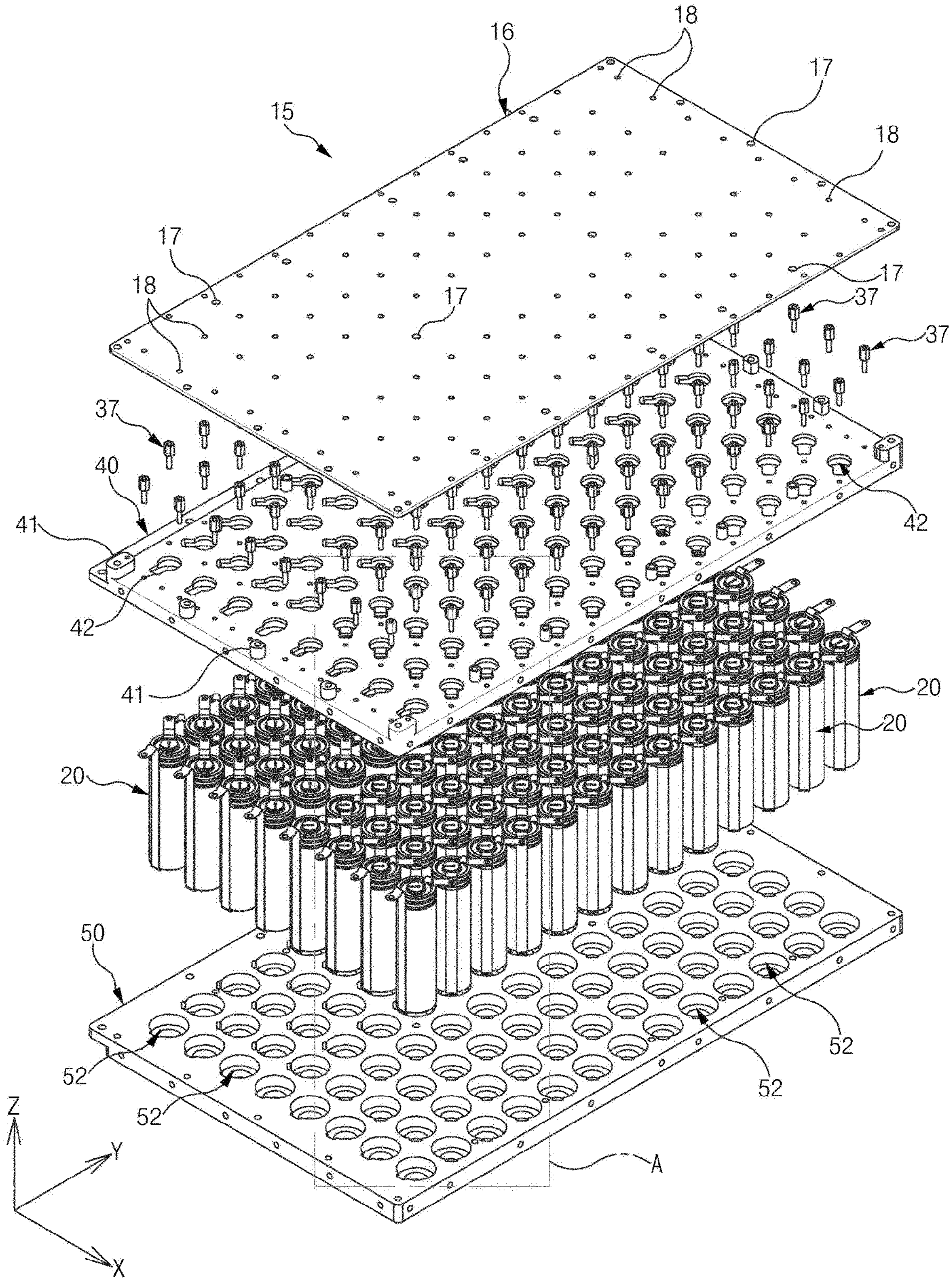
FIG. 3 is an exploded view drawing which illustrates the battery module of FIG. 2.

FIG. 1 is a perspective view of the battery package according to an embodiment of the present invention. FIG. 2 is an exploded view drawing which illustrates a figure when the case cover from FIG. 1 is removed and the remaining parts of the case are disassembled. FIG. 3 is an exploded view drawing which illustrates the battery module of FIG. 2. By referring to FIG. 1 to FIG. 3 altogether, a battery package (1) according to an embodiment of the present invention can for example, be used in devices such as a satellite or an automobile to supply electric power, or in an Energy Storage System (ESS), and include a case (2) and multiple battery modules (15) placed inside of the aforementioned case (2).

The aforementioned case (2) includes a base (3) which is equipped with an internal space where the aforementioned multiple battery modules (15) are placed, and a cover (10) which closes the upper open side of the aforementioned base (3).

The aforementioned base (3) includes a baseplate (4), a front plate (5), a back plate (6), a right side plate (7), and a left side plate (8), which are coupled and fixed to each of the four corners of the aforementioned baseplate (4) to arrange the internal space. The aforementioned baseplate (4) may have a quadrangular shape parallel to the cover (10).

The aforementioned case (2) includes multiple partition walls (9) which divide the internal space of the aforementioned base (3), so that multiple battery modules (15) can be sorted and placed inside of the base (3).

Figure 4:
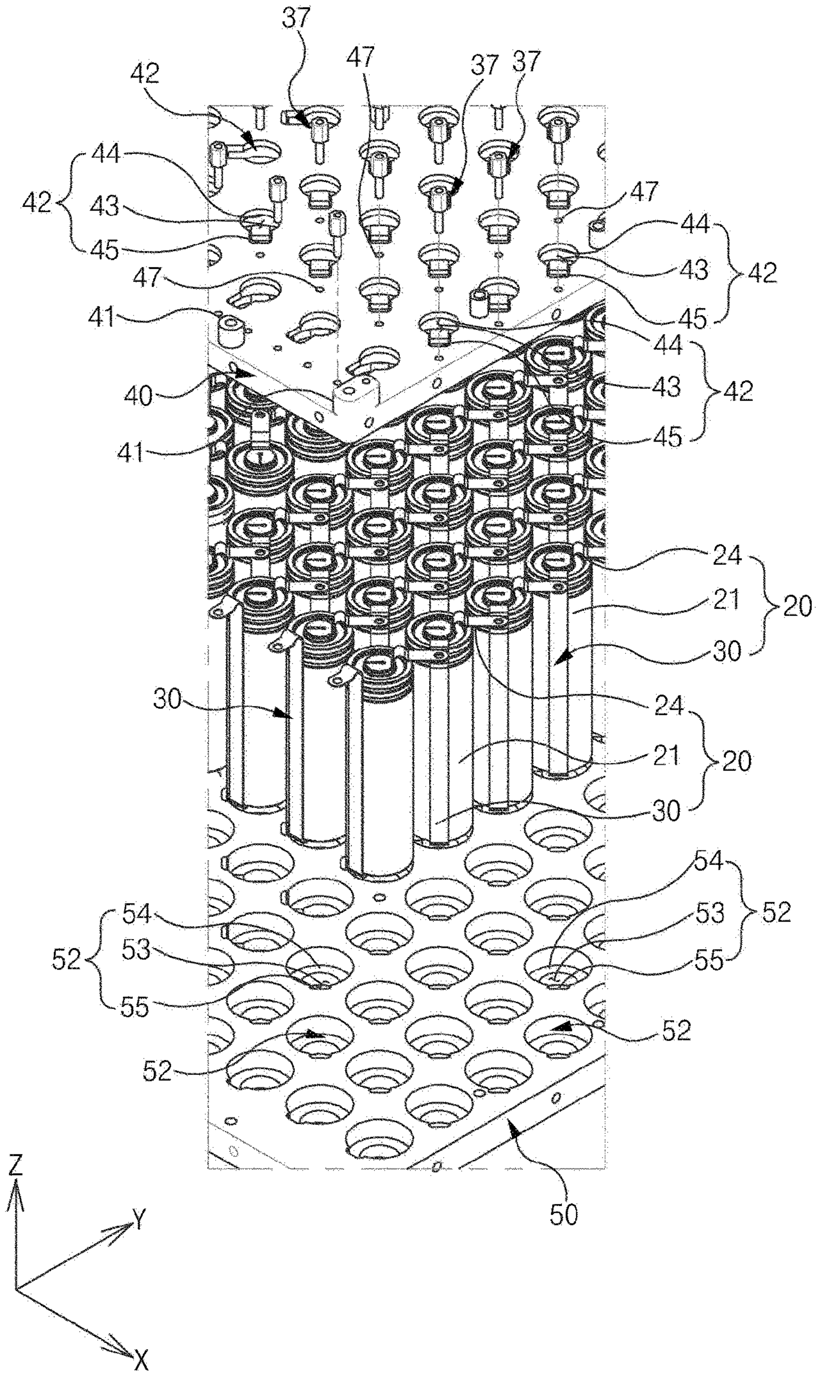
FIG. 4 is an enlarged view of part A of FIG. 3.
Figure 5:
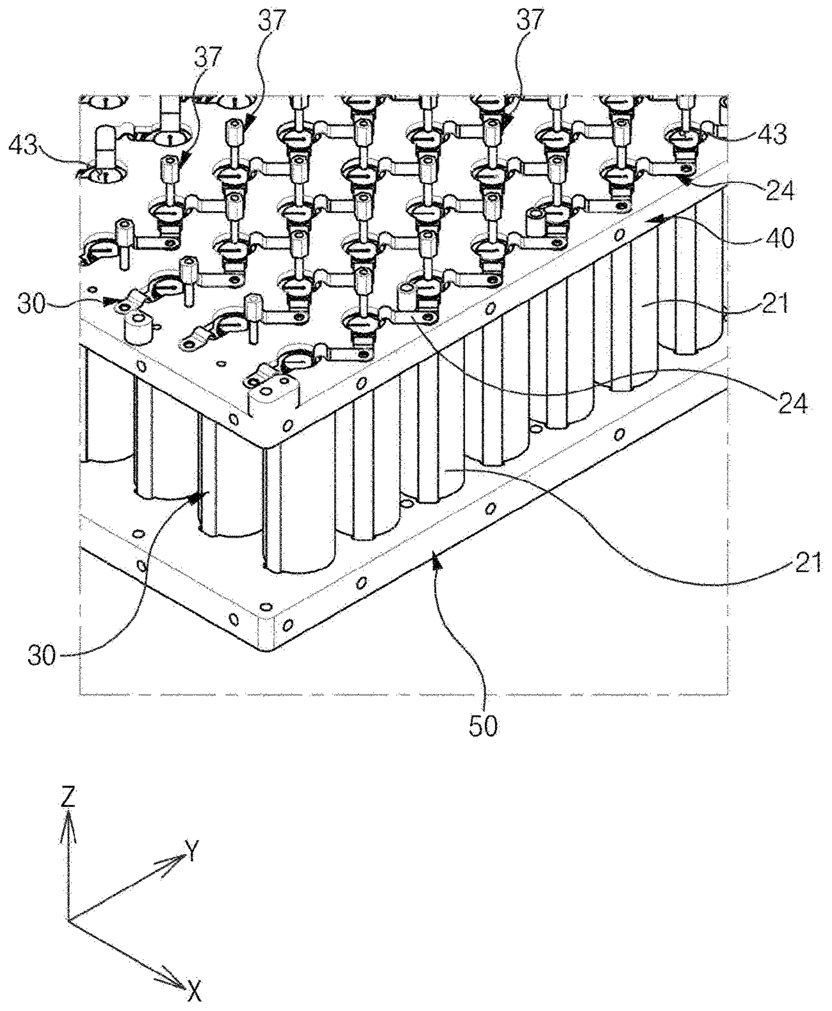
FIG. 5 is an enlarged view of part A of FIG. 3 when assembled.
Figure 6:
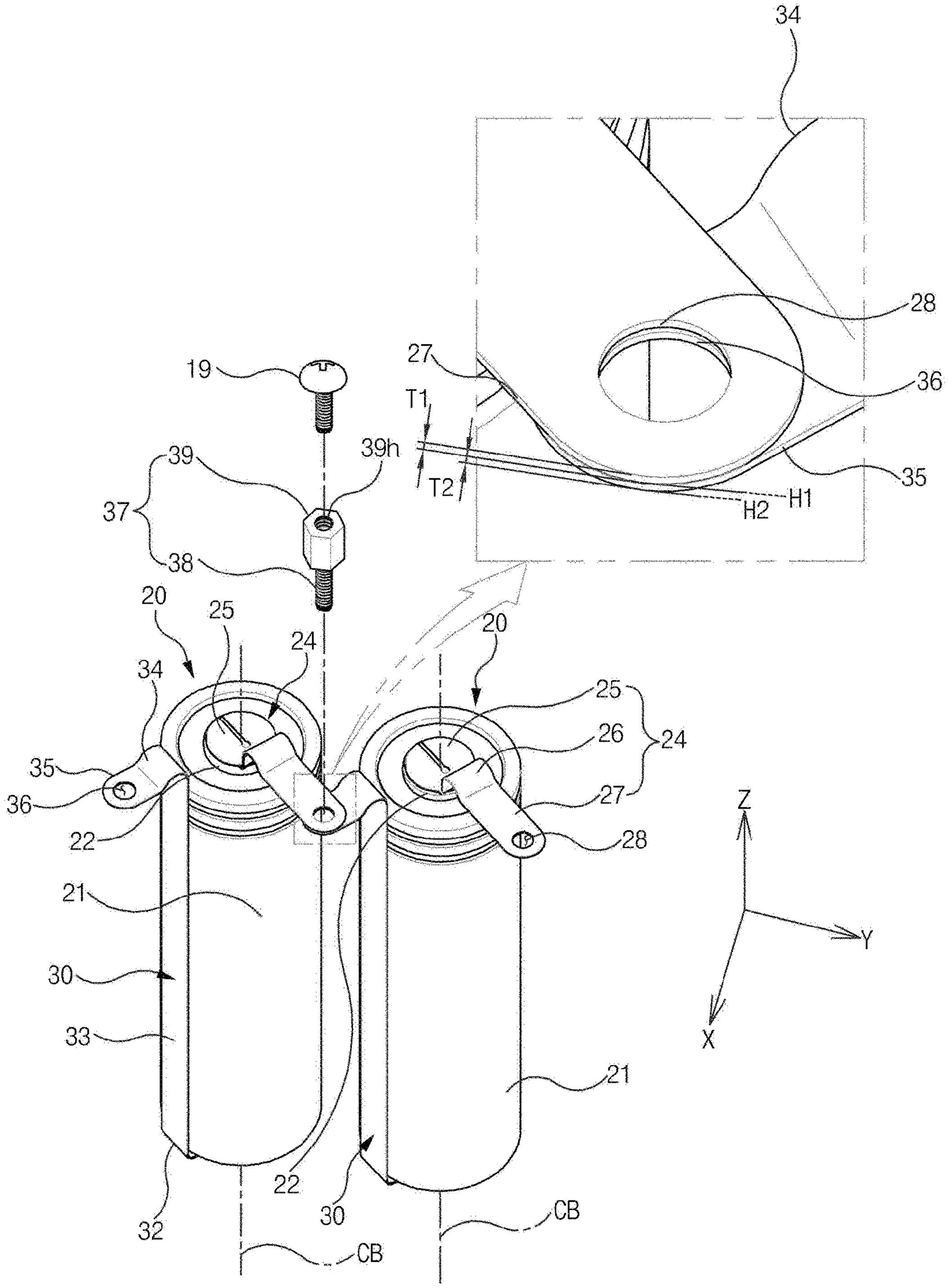
FIG. 6 is a perspective view which illustrates the structure of how a pair of battery cell assemblies adjacent to each other can be connected in series.
Figure 7:
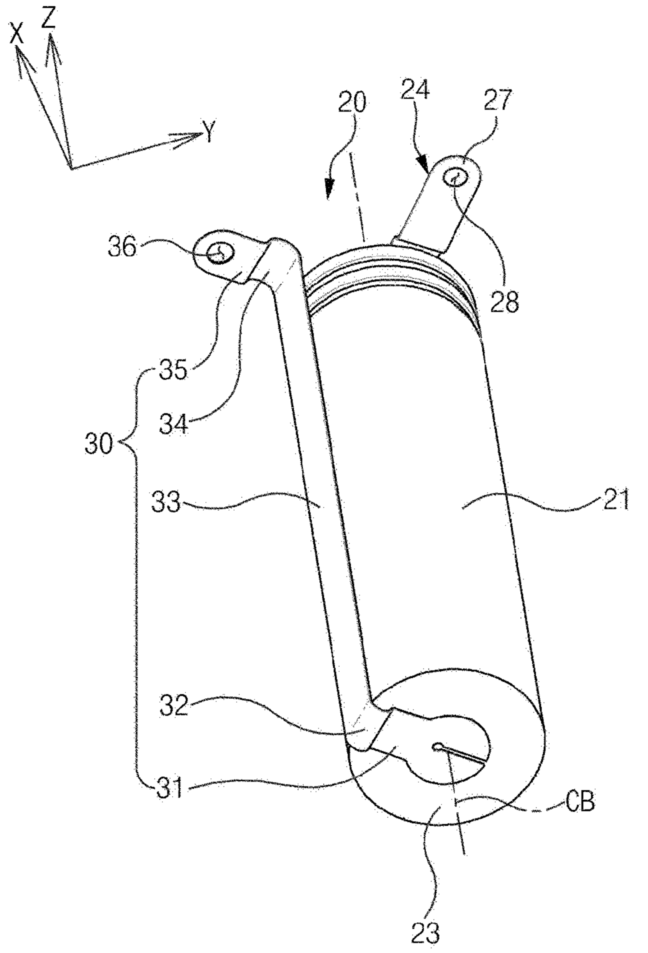
FIG. 7 is a perspective structure of the battery cell assembly of FIG. 6 when viewed from below.

FIG. 4 is an enlarged view of part A of FIG. 3. FIG. 5 is an enlarged view of part A of FIG. 3 when assembled. FIG. 6 is a perspective view which illustrates the structure of how a pair of battery cell assemblies adjacent to each other can be connected in series. FIG. 7 is a perspective structure of the battery cell assembly of FIG. 6 when viewed from below. In reference to FIG. 3 to FIG. 7 altogether, each battery module (15) includes multiple battery cell assemblies (20), an upper end supporting structure (40), a lower end supporting structure (50), a circuit board (16), and multiple connector pins (37).

Each battery cell assembly (20) includes battery cells (21), the first connector (24), and the second connector (30). The aforementioned battery cell (21) may be a secondary cell capable of charging and discharging. A battery cell (21) is in a cylindrical shape and electrodes with opposite polarities (22, 23) are formed on its upper and the lower ends. In the embodiment illustrated in FIG. 6 and FIG. 7, the aforementioned electrode of the upper end (22) is an anode and the electrode of the lower end (23) is a cathode, but the electrodes can be formed inversely.

The first connector (24) and the second connector (30) are composed of metal plates. The material of the aforementioned metal plates can be for example, nickel (Ni) or metals with excellent electrical conductivity and strong solidity such as nickel alloys including nickel. The first connector (24) includes one end (25) fixed to the aforementioned upper end electrode (22), so that an electric current can flow, other end (27) which is extended in a direction away from the central axis line (CB) of the aforementioned battery cell, and a middle bent section (26) which connects the aforementioned one end (25) and the other end (27).

The aforementioned middle bent section (26) is a part that can be bent when assembling the battery module (15), and it is formed in a shape that the internal stress can be dispersed, not to be cut or destroyed even when bent. The aforementioned one end (25) is coupled and fixed to the aforementioned upper end electrode (22) through welding. In the aforementioned other end (27), a through hole (28) is formed, where the stick portion (38) of the later-described connector pin (37) gets inserted.

The second connector (30) includes one end (31) fixed to the aforementioned lower end electrode (23), so that an electric current can flow, other end (35) which is extended in a direction away from the central axis line (CB) of the aforementioned battery cell, a middle straight section (33) which extends parallel to the longitudinal direction of the battery cell (21) in between the aforementioned one end (31) and the other end (35), a lower side bent section (32) which connects the aforementioned one end (31) and the aforementioned middle straight section (33), and an upper side bent section (34) which connects the aforementioned other end (35) and the middle straight section (33).

The aforementioned lower side bent section (32) and the upper side bent section (34) are parts that can be bent when assembling the battery module (15), and they are formed in a shape that the internal stress can be dispersed, not to be cut or destroyed even when bent. The aforementioned one end (31) is coupled and fixed to the aforementioned upper end electrode (23) through welding. In the aforementioned other end (35), a through hole (36) is formed, where the stick portion (38) of the later-described connector pin (37) gets inserted.

The other end (27) of the first connector (24) and the other end (35) of the second connector (30) are extended in directions, so that the space between the two ends gets wider as they approach the bottom end, and directions that the two ends are not parallel with each other. More specifically, an imaginary extension line (not illustrated) of the other end (27) of the first connector (24) and an imaginary extension line (not illustrated) of the other end (35) of the second connector (30) are at an angle of 80 to 150° to each other and each of them intersects with the aforementioned central axis line (CB).

In reference to FIG. 5 to FIG. 7 altogether, in the battery module (15), the aforementioned other end (27) of the first connector (24) and the aforementioned other end (35) of the second connector (30) are supported by the upper side of the upper end supporting structure (40), but the electrode (22) at the upper end of the battery cell (21) does not protrude the upper surface of the upper end supporting structure (40). The height (H1) of the other end (27) of the first connector (24) and the height (H2) of the other end (35) of the second connector (30) are higher than the height of the aforementioned electrode (22) of the upper end.

In reference to FIG. 3 to FIG. 7 altogether again, the battery module (15) includes multiple numbers of battery cell assemblies (20), and the aforementioned battery cell assemblies are arranged in series. Among the aforementioned battery cell assemblies (20) arranged in series, the other end (27) of the first connector (24) of one battery cell assembly (20) and the other end (35) of the second connector (30) of another battery cell assembly (20) adjacent to the aforementioned one battery cell assembly (20) can be overlapped in contact and connected, so that electric current can flow.

In the illustrated embodiment, the lower side of the other end (27) of the first connector (24) of one battery cell assembly (20) are overlapped in contact with the upper side of the other end (35) of the second connector (30) of another adjacent battery cell assembly (20). Therefore, the height (H1) of the aforementioned other end (27) of the first connector (24) is higher than the height (H2) of the aforementioned other end (35) of the second connector (30) by the thickness (T2) of the aforementioned other end (35) of the second connector (30). In all battery cell assemblies (20) in series, the heights (H1) of the other ends (27) of the first connectors (24) are the same, and the heights of the other ends (35) of the second connectors (30) are also the same. Therefore, even when viewing restricted to a single battery cell assembly (20), the height (H1) of the other end (27) of the first connector (24) is higher than the height (H2) of the other end (35) of the second connector (30) by the thickness (T2) of the aforementioned other end (35) of the second connector (30).

On the other hand, as opposed to the illustrated embodiment, in a pair of battery cell assemblies (20) that are adjacent to each other, the upper side of the other end (27) of the first connector (24) of one battery cell assembly (20) can be overlapped in contact with the lower side of the other end (35) of the second connector (30) of another battery cell assembly (20). In this case, the height (H2) of the other end (35) of the second connector (30) is higher than the height (H1) of the other end (27) of the first connector (24) by the thickness (T1) of the aforementioned other end (27) of the first connector (24).

The upper end supporting structure and the lower end supporting structure support the upper end and the lower end of the aforementioned multiple battery cells (21), so that the battery cells (20) of multiple battery cell assemblies (20) are arranged in a matrix but apart from each other. More specifically, in the upper end supporting structure (40), multiple upper end seating portions (42) are formed, where the upper ends of multiple battery cells (21) are fitted and seated. Multiple upper end seating portions (42) are arranged in a matrix apart from each other.

Each upper end seating portion (42) includes a connector installation through hole (43) that is formed to be capable of welding one end (25) of the first connector (24) to the upper end electrode (22) of the battery cell (21), a side dent (45) that is dented with a step towards one side of the internal space limiting the aforementioned connector installation through hole (43), and a stepped seating surface (44) in which the upper end of the aforementioned battery cell (21) is blocked and seated, so that it does not penetrate and protrude through the upper side of the aforementioned upper end supporting structure (40). Through the aforementioned connector installation through hole (43), one end (25) of the first connector (24) that is joined with the upper end electrode (22) of the battery cell (21) is exposed towards the upper side.

Due to the aforementioned side dent (45), the middle straight section (33) of the second connector (30) can be extended without being too tight with the outer surface of the battery cell (21). In addition, the lower side bent section (32) and the upper side bent section (34) of the second connector (30) might be bent sometimes, so that the other end (35) of the second connector (30) can be put on to the upper side surface of the upper end supporting structure (40) by penetrating the upper end supporting structure (40), due to the aforementioned side dent (45), the bending angle when bending the aforementioned lower side bent section (32) and the upper side bent section (34) can be minimized to the angle range within the elastic deformation range.

In the lower end supporting structure (50), multiple lower end seating portions (52) are formed, where the lower ends of multiple battery cells (21) are fitted and seated. Multiple lower end seating portions (52) are arranged in a matrix but apart from each other. Each lower end seating portion (52)

includes a connector installation through hole (53) that is formed to be capable of welding one end (31) of the second connector (30) to the lower end electrode (23) of the battery cell (21), a side dent (55) that is dented with a step towards one side of the internal space limiting the aforementioned connector installation through hole (53), and a stepped seating surface (54) in which the lower end of the aforementioned battery cell (21) is blocked and seated, so that it does not penetrate and protrude through the lower side of the aforementioned upper end supporting structure (40).

Although it is not illustrated clearly on the drawing, one end (31) of the second connector (30), which is joined to the lower end electrode (23) of the battery cell (21) through the aforementioned connector installation through hole (53), is exposed to the lower side. Due to the aforementioned side dent (55), the middle straight section (33) of the second connector (30) can be extended upwards without having to be too close to the outer surface of the battery cell (21). A side dent (45) of any one upper end seating portion (42) and a side dent (55) of a lower end seating portion (52) corresponding to the aforementioned one upper end seating portion (42) are dented in the same direction.

As it is illustrated in FIG. 5, among multiple battery cell assemblies (20) forming a matrix, one other end (27) of a first connector (24) of one battery cell assembly (20) and another other end (35) of a second connector (30) of another battery cell assembly (20) adjacent to the aforementioned one battery cell assembly (20) are overlapped in contact on the upper side surface of the upper end supporting structure (40), so that an electric current can flow. Here, the through hole (28) formed on the other end (27) of the first connector (24) and the through hole (36) formed on the other end (35) of the second connector (30) that are overlapped with each other are aligned above and below.

By being connected through contact like this, multiple battery cell assemblies (20) belonging to the same row are connected in series, so that electric currents can flow. Multiple battery cell assemblies (20) belonging to the same column are not connected in series. However, the other end (35) of the second connector (30) of a battery cell assembly (20) belonging to the first column do not overlap with the other end (27) of the first connector (24) of another battery cell assembly (20), and the other end (27) of the first connector (24) of a battery cell assembly (20) belonging to the last column also do not overlap with the other end (35) of the second connector (30) of another battery cell assembly (20).

The circuit board (16) is placed on the upper side of the upper end supporting structure (40). In the aforementioned circuit board (16), circuits (not illustrated) corresponding to the battery management system (BMS) are formed. The aforementioned circuits of the battery management system include balancing circuits for stable voltage output and life extension of each battery cell.

Supported by multiple connection bosses (41) protruding upwards from the upper side surface of the upper end supporting structure (40), the lower side surface of the circuit board (16) is placed apart from the upper side surface of the upper end supporting structure (40). Due to the multiple circuit board fastening bolts (not illustrated) fastened to the aforementioned multiple circuit boards (16) by penetrating the circuit board (16) in the direction of the thickness, the aforementioned circuit board is fixed to and supported by the upper end supporting structure (40). The reference number 17 is the penetration hole of the circuit board fastening bolt formed in the circuit board (16) that is penetrated by the aforementioned circuit board fastening bolt.

Multiple connector pins (37) connect multiple battery cell assemblies (20) to the circuit board, so that electric currents can flow. Each connector pin is for example, made of cupper (Cu) or metals that have excellent electrical conductivities such as cupper alloys. Each connector pin (37) includes a stick portion (38) which is placed into the through hole (28) of the first connector (24) or the through hole (36) of the second connector (30), and a head portion (39) that has a bigger diameter than the diameter of the aforementioned stick portion (38) on the upper side of the aforementioned stick portion (38). On the outer surface of the aforementioned stick portion (38), a male screw pattern is formed.

The aforementioned stick portion (38) penetrates the through hole (28) of the other end (27) of the first connector (24) placed on the upper side surface of the upper end supporting structure (40) or another through hole (36) of the other end (35) of the second connector (30), and is fitted and fixed on the upper side surface of the upper end supporting structure (40). On the upper side surface of the aforementioned upper end supporting structure (40), multiple connector pin fastening holes (47) formed in a female screw pattern, so that the aforementioned stick portions (38) can be joined. The aforementioned head portion (39) may have a hexagonal shape, so that the aforementioned head portion (39) that can be fit in the aforementioned connector pin fastening hole (47) by grabbing the head portion (39) with a tool (not illustrated) and turning it.

On the lower side surface of the circuit board (16), multiple terminals (not illustrated) of the aforementioned balancing circuits are formed. The aforementioned multiple terminals correspond to the aforementioned multiple connector pins (37) one to one, and the upper side surface of the head portions (39) of all the connector pins (37) touches the corresponding terminals on the lower side surface of the aforementioned circuit board (16). As aforementioned, among multiple battery cell assemblies (20) forming a matrix, the other end (35) of the second connector (30) of a battery cell assembly (20) belonging to the first column exceptionally does not overlap with another other end (27) of the first connector (24), and the other end (27) of the first connector (24) of a battery cell assembly (20) belonging to the last column exceptionally does not overlap with another other end (35) of the second connector (30).

However, except for the aforementioned two types of exceptions, since the through hole (28) of the first connector (24) of one battery cell assembly (20) and the through hole (36) of the second connector (30) of another battery cell assembly (20) that is adjacent to the aforementioned one battery cell assembly (20) are aligned, the stick portion (38) of the connector pin (37) penetrates the aforementioned pair of aligned through holes (28, 36) and gets fitted and fixed in the connector pin fastening hole (47) of the upper end supporting structure (40), and the head portion (39) of the aforementioned connector pin (37) presses down the other end (27) of the first connector (24) and the other end (35) of the second connector (30) which are overlapped in contact, so that the two ends adhere to each other.

In summary, the stick portion (38) which penetrates the aforementioned pair of aligned through holes (28, 36) and gets fixed to the upper end supporting structure (38) and the connector pin (37) including a head portion (39) that touches the corresponding terminals (not illustrated) prepared in the lower side of the circuit board (16) connect the electrically connected other end (27) of the first connector (24) and the other end (35) of the second connector (30) with the balancing circuit of the circuit board, so that an electric current can flow. Meanwhile, in one of the aforementioned two exceptions, so the stick portion (38) that penetrates the through hole (36) formed in the other end (35) of the second connector (30) of a battery cell assembly (20) belonging to the first column and gets fixed to the upper end supporting structure (40), and the connector pin (37) including the head portion (39) which touches the corresponding terminal (not illustrated) prepared in the lower side of the circuit board (16) connect the aforementioned other end (35) of the second connector (30) and the balancing circuit of the circuit board (16), so that an electric current can flow. In addition, in the other one of the aforementioned two types of exceptions, so the stick portion (38) which penetrates the through hole (28) formed in the other end (27) of the first connector (24) of a battery cell assembly (20) belonging to the last column and gets fixed to the upper end supporting structure (40), and the connector pin (37) including the head portion (39) which touches the corresponding terminal (not illustrated) prepared in the lower side of the circuit board (16) connect the aforementioned other end (27) of the first connector (24) and the balancing circuit of the circuit board (16), so that an electric current can flow.

To prevent the contact of the aforementioned head portion (39) and the corresponding terminals at the lower side of the circuit board (16) from being disturbed due to unintentional external impact, the head portion (39) of each connector pin (37) gets fixed to the circuit board (16) through the connector pin fastening bolt (19). More specifically, in the upper side of the head portion (39) of each connector pin (37), fastening bolt holes (39*h*) forming female screw patterns inside the cylindrical surface are formed, and in the circuit board (16), connector pin fastening bolt holes (18) are formed at positions aligned with the fastening bolt holes (39*h*) of all the connector pins (37). By fitting the aforementioned connector pin fastening bolt (19) to the aforementioned connector pin fastening bolt hole (18) and penetrating the circuit board (16), and fitting and fixing it into the aforementioned fastening bolt hole (39*h*), the contact between the upper side surface of the aforementioned head portion (39) and the lower side surface of the circuit board (16) are maintained with reliability.

In reference to FIG. 1 to FIG. 3 altogether again, multiple battery modules (15) are connected to and supported by the adjacent battery modules (15) inside of the internal space of the base (3). More specifically, the facing corners of an adjacent pair of upper end supporting structures (40) can be overlapped and fastened by multiple fastening bolts (not illustrated), and the facing corners of an adjacent pair of lower end supporting structures (50) can be overlapped and fastened by multiple fastening bolts (not illustrated).

A battery package (1) comprises multiple battery cell assemblies belonging to one battery module (15), and more middle partition walls (9) to spatially separate multiple battery cell assemblies (20) belonging to another battery module (15) adjacent to the aforementioned one battery module (15).

Meanwhile, the battery package (1) according to an embodiment of the present invention explained so far, is a battery package, in which the circuit board (16) is placed in the upper end supporting structure (40), also the battery packages, in which the circuit board is placed in the lower end supporting structure (50) may also be included in the present invention. In this case, for the other end of the first connector which is joined to the upper end electrode of the battery cell and the other end of the second connector which is joined to the lower end electrode of the battery cell to be in contact with the lower side surface of the lower end supporting structure (50), the height of the aforementioned other end of the first connector and the eight of the aforementioned other end of the second connector may be shorter than the height of the lower end electrode of the battery cell.

According to the battery package (1) explained above, multiple battery cells (21) are connected in series and at the same time, each of them are connected to the balancing circuit without having to have a wiring harness. Therefore, the reliability for the performance of the battery package is improved and its lifespan is extended.

In addition, even if multiple numbers of battery cells (20) are included, since there is no need for wiring harnesses as many as the number of the battery cells (20), it is easy to reduce the size and the weight of the battery package (1), and it is easy to disassemble and repair, when disorders occur.

Although the present invention is described by an embodiment illustrated on the drawings, this is only exemplary, and those with ordinary skill in the present field shall understand that various modifications and alternative forms of embodiments are possible. Therefore, the protection scope of the present invention shall be subject to the scope of the appended claims.

The present invention can be used in industrial fields where batteries are used for supplying energy, such as in small devices like mobile phones, automobiles, satellites, and energy storage systems.

The invention claimed is:

1. A battery cell assembly, comprising:

a plurality of battery cells each comprising a first electrode formed at an upper end and a second electrode formed at a lower end, the first electrode and the second electrode having opposite polarities, the plurality of battery cells arranged such that first electrodes thereof are oriented in a same direction;

wherein each battery cell further comprises:

a first connector composed of a metal plate, comprising:

a first end fixed to the first electrode at the upper end to allow an electric current to flow, and a second end extending in a direction away from a center of a corresponding battery cell and being positioned at a level higher than the first electrode of the corresponding battery cell; and a second connector composed of a metal plate separate from the first connector, comprising:

a first end fixed to the second electrode at the lower end to allow an electric current to flow, and a second end extending in a direction away from the center of the corresponding battery cell and being positioned at a level higher than the first electrode of the corresponding battery cell, wherein the second end of the first connector and the second end of the second connector respectively extend outward in non-parallel, diverging radial directions of the battery cell, such that a space between the second end of the first connector and the second end of the second connector increases in a radial direction of the battery cell, and wherein the second end of the first connector of the corresponding battery cell and the second end of the second connector of an adjacent battery cell arranged in series are electrically connected to each other and positioned at levels higher than first electrodes of the corresponding battery cell and the adjacent battery cell.

2. The battery cell assembly of claim 1, wherein a height difference between the second end of the first connector and the second end of the second connector is equal to a thickness of the second end of the second connector.

3. The battery cell assembly of claim 1, wherein the first end of the first connector is welded to the upper end, and the first end of the second connector is welded to the lower end.

4. The battery cell assembly of claim 1, wherein through holes are respectively formed in the second end of the first connector and the second end of the second connector, each through hole being configured to receive a connector pin made of metal.

5. The battery cell assembly of claim 1, wherein the first connector further comprises a first bent middle section connecting the first end thereof and the second end thereof, the first bent middle section being curved and positioned higher than the first end thereof and the second end thereof, and wherein the second connector further comprises a second bent middle section connecting the first end thereof and the second end thereof, the second bent middle section being curved and positioned higher than the first end thereof and the second end thereof.

6. A battery package, comprising;

the battery cell assembly in accordance with claim 1, in which the plurality of batteries are arranged in series;

an upper end supporting structure and a lower end supporting structure configured to support upper and lower ends of the plurality of battery cells, such that the plurality of battery cells are spaced apart from each other;

a circuit board disposed on an upper side of the upper end supporting structure; and a plurality of connector pins made of metal, which connect the plurality of battery cells to the circuit board to allow electric current to flow, wherein the second end of the first connector of the corresponding battery cell and the second end of the second connector of the adjacent battery cell are in contact with and overlap each other on an upper surface of the upper end supporting structure to allow electric current flow between adjacent battery cells, and wherein one of the connector pins electrically connects the second end of the first connector and the second end of the second connector that overlap each other, to the circuit board to allow electric current to flow.

7. The battery package of claim 6, wherein through holes are respectively formed in the second end of the first connector and the second end of the second connector of each battery cell, such that when the second end of the first connector of the corresponding battery cell and the second end of the second connector of the adjacent battery cell are in contact with and overlap each other, the through holes are aligned with each other, and wherein each of the connector pins includes a shaft portion that penetrates the through holes aligned with each other, and a head portion that electrically contacts the circuit board.

8. The battery package of claim 7, wherein wherein the shaft portion penetrates the through holes aligned with each other, and is fitted and fixed in the upper end supporting structure, and wherein the head portion applies pressure on the second end of the first connector and the second end of the second connector that are in contact with and overlap each other, so as to maintain an overlapping contact between the second end of the first connector and the second end of the second connector.

9. The battery package of claim 7, wherein the head portion is fixed to the circuit board through a fastening bolt.

10. The battery package of claim 6, wherein the upper end supporting structure comprises:

a plurality of upper end seating portions in which upper ends of the plurality of battery cells are fitted and seated, wherein each of the upper end seating portions includes:

a connector installation through hole through which the first end of the first connector welded to the first electrode of the corresponding battery cell is exposed toward an upper side of the upper end supporting structure such that the second end of the first connector of the corresponding battery cell is positioned higher than the upper surface of the upper end supporting structure;

a stepped seating surface configured to block and seat the upper end of the corresponding battery cell such that the corresponding battery cell does not protrude through the upper side of the upper end supporting structure; and a side dent formed with a step on one side of an internal space defining the connector installation through hole, wherein the second end of the second connector of the corresponding battery cell is configured to pass through the side dent and be positioned on the upper surface of the upper end supporting structure.

* * * * *